May 7, 1957 L. P. THOMAS ET AL 2,791,627

NOISE CANCELLATION CIRCUITS WITH INTERMEDIATE FREQUENCY AMPLIFIER SCREEN GRID NOISE DETECTION

Filed Nov. 23, 1951

INVENTORS
Lucius P. Thomas
& Clyde W. Hoyt
BY [signature]
ATTORNEY

United States Patent Office 2,791,627 Patented May 7, 1957

2,791,627

NOISE CANCELLATION CIRCUITS WITH INTERMEDIATE FREQUENCY AMPLIFIER SCREEN GRID NOISE DETECTION

Lucius P. Thomas, Collingswood, and Clyde W. Hoyt, Pennsauken, N. J., assignors to Radio Corporation of America, a corporation of Delaware Application November 23, 1951, Serial No. 257,746

4 Claims. (Cl. 178—7.3)

This invention relates to noise cancellation and more particularly to the cancellation of noise impulses in the synchronization circuits of television receivers.

Noise cancellation circuits for television receiver synchronization circuits, as evidenced by the United States patent to Jack Avins, No. 2,717,920, issued September 13, 1955, for Signal Processing Circuits, have been utilized with a great deal of success. Separate noise amplifier stages are provided in the reversal of the noise polarity to afford cancellation. It is a primary object of this invention to provide noise cancellation circuits which do not necessitate a separate noise amplifier stage.

According to this invention a noise impulse potential of proper phase and polarity to cancel the noise impulse potentials at the sync separator input terminals is derived from an intermediate frequency amplifier system. Thus, the video signals applied to the synchronization circuits become relatively noise-free.

It is another object of the invention to improve the immunity of television circuits to noise impulses.

It is still another object of the invention to provide improved synchronization circuits.

It is a further object of the invention to provide simplified noise immunization circuits.

It is still a further object of the invention to provide simplified means for cancelling noise impulses in sync separator circuits.

Other objects and advantages of the invention will be found throughout the following detailed description of the invention and its mode of operation. For a clear understanding of the invention, the description should be considered in connection with the accompanying drawing, in which.

Figure 1:
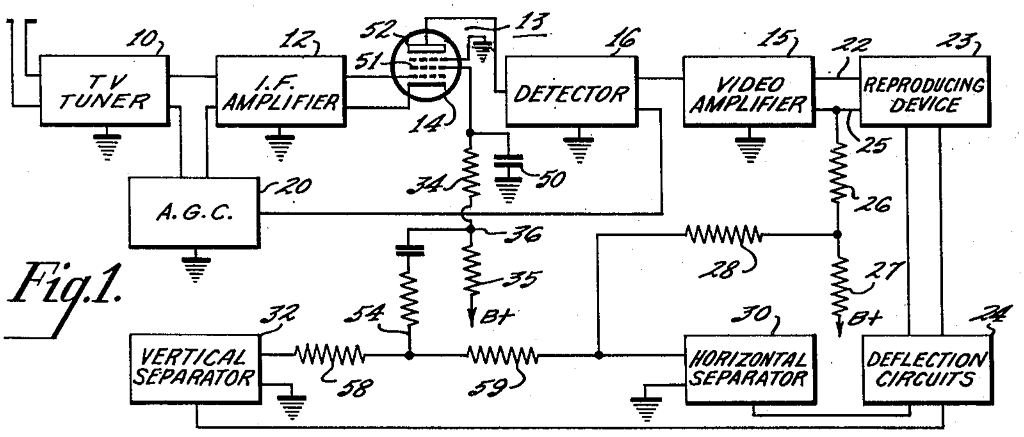
Figure 1 is a combination block and circuit diagram of a television receiver embodying the invention.

Throughout the various figures of the drawing like reference characters represent like circuit elements. Those circuit elements which may in themselves be entirely conventional and whose details form no part of the present invention are indicated in simplified block form so that the features of the invention may be more readily apparent.

In Figure 1 a conventional television tuner circuit 10 supplies converted signals to be preliminary intermediate frequency amplifier circuit 12, which is connected to a final intermediate frequency amplifier stage 13 including electron tube 14. The final I. F. amplifier tube 14 is coupled to the usual video amplifier 15 by means of detector 16. An automatic gain control circuit 20 is connected between the detector 16 and the preceding amplifier stages in the usual manner to provide the proper gain in the tuner 10 and I. F. amplifier 12.

One video output lead 22 connects the output terminal of the video amplifier 15 to a reproducing device 23, such as a kinescope, to which is also connected the usual deflection circuits 24. A further video output lead 25 is connected by means of a resistance network 26, 27, 28 to the horizontal and vertical separator stages 30, 32. Operation of the deflection circuits 24 from the horizontal and vertical separator stages 30, 32 is conventional.

Figure 2:
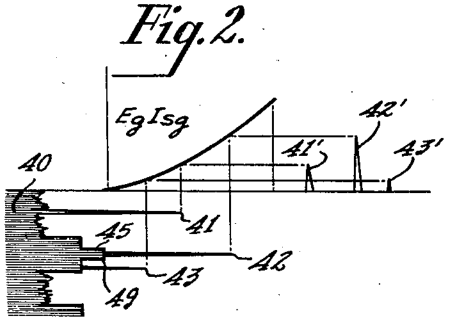
Figure 2 is a graph of tube operating characteristics together with accompanying signal waveforms illustrating the principle of operation of the invention.

At the final I. F. amplifier tube 14, the screen grid circuit includes a voltage dividing network, comprising the series resistors 34, 35 connected to the B+ terminal to supply screen grid operating potential and to provide at the junction 36 an output signal in accordance with the present invention. Operating potentials of proper value may be supplied to the tube 14 by those skilled in the art to provide operational characteristics as shown in Figure 2. The curve in Figure 2 illustrates a well known characteristic of pentode type amplifiers involving an increasing shift of electron conduction to the screen electrode for increasingly more positive excursions of the control grid once anode saturation has been reached. In other words, in Figure 1, as the control electrode of tube 14 swings in a positive direction with respect to its cathode, the current passed by the anode 52 will increase until the voltage drop across the impedance presented by the detector circuit causes the anode voltage to drop to a point where the screen grid 51 is sufficiently more positive than the anode to attract an increasing number of electrons. As soon as this anode "bend" or saturation point is reached the pentode amplifier no longer is linear in its operation and the average screen grid current will increase disproportionately to an increase in the signal applied to the control electrode. Thus, for signals applied to the amplifier 52 below the anode saturation point a virtually steady average D.-C. current will flow through the resistor 34 to the screen grid electrode. The capacitor 50 is chosen of a value sufficiently high to provide a low impedance path to ground for signals falling in the intermediate frequency pass band of the intermediate frequency amplifier.

Under normal operating conditions, in the arrangement of Figure 1, the peak of the synchronizing signal 49 (Figure 2) will be kept below the anode "bend" or saturation point in the amplifier 14. This means that virtually no alternating current signal will appear across the resistors 34 or 35 since operation is substantially linear. The screen grid of the pentode 14 will act much like the anode of a Class "A" amplifier. The capacitor 50 will bypass all signals at the intermediate frequency thereby preventing degeneration of the intermediate frequency signals themselves in the pentode amplifier stage. However, upon the occurrence of a noise pulse such as 41, 42 and 43 in Figure 2, the pentode 14 will be driven into its non-linear operating range beyond the anode saturation or "bend" point. Non-linearity, of course, will obtain and there will be an increase in the screen electrode current corresponding to the noise pulses 41, 42 and 43. The waveform that will appear across the resistors 34 and 35 will necessarily, in accordance with the present invention, correspond to the noise pulses themselves, since non-linear action of the amplifier causes the screen circuit to appear as a noise detector having a substantial gain. The amplitude of the noise signal appearing at the point 36 (corresponding to the junction of resistors 34 and 35) may be quite high relative to the peak video I. F. signal normally appearing across the anode of the tube 14.

For ideal operating conditions it may be seen that the tube potentials should be chosen such that the normal modulated intermediate frequency signal never causes the pentode 14 to swing into non-linear operation. This prevents the synchronizing pulse 49 from being detected in the screen circuit and degenerating itself as will be hereinafter more apparent. Because of the automatic gain control circuit 20 connected to the tuner and intermediate frequency amplifier stages, the acceptance curve of the amplifier 14 may be caused to embrace only the composite video signal 40, including the synchronizing pulse 49. Only noise pulses will, therefore, drive the amplifier into non-linear operation and produce an electrical signal at the point 36. Thus, it is seen that the screen circuit of the final I. F. stage 13 is utilized as a simplified noise detector and amplifier stage, without the provision of extra amplification stages and without interfering with the normal functioning of the circuit.

The amplified noise signals at terminal 36 may therefore be connected to video output signals at the horizontal and vertical separator circuits 30, 32 to cancel out the noise impulses arriving there from the video amplifier 15. To assure proper polarity an odd number of video amplifier stages should precede the lead 25 when it is connected in the aonde output circuit of a video amplifier tube. Any person skilled in the art may select the proper polarities and amplitudes for effective noise cancellation. It is of importance to keep the noise pulses in the same phase at the cancellation circuit to assure complete cancellation and to provide the highest available amplitude. Accordingly it is preferable to take the pulses from the final I. F. amplifier circuit to prevent possibility of phase shift in a greater number of amplifier stages subsequent to the noise take-off point, but the invention need not be limited thereto.

Figure 3:
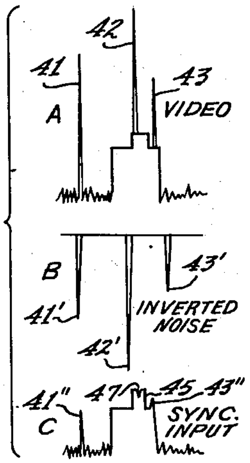
Figure 3 is a waveform diagram illustrating the noise cancellation accomplished in accordance with the invention.

As shown in Figure 3*a*, the initial detected video signal at lead 25 has noise pulses 41, 42, 43 superimposed thereon. The detected and inverted noise (Figure 3*b*) derived at terminal 36 of the final I. F. amplifier screen grid circuit therefore when added to the video signal in the synchronization pulse separator circuits provides a modified and improved video signal shown in Figure 3*c*. In this case, the noise extending above the synchronization pulse 45, which would otherwise interfere with the operation of the separator circuits 30, 32, is cancelled. The amplitude of the cancelling noise impulses of Figure 3*b* is not critical, since any amount of cancellation will improve circuit operation, and over compensation of noise coincident with the sync pulse 45 will provide small dips 47, in the improved waveform of Figure 3*c* which are relatively unnoticeable in the operation of separator circuits as compared with undercompensation. This is true because of the small energy content and short time duration of the dips as compared with the synchronizing pulse. The noise pulses not coinciding with sync pulse 45 are in general held below the cutoff level of the sync separator tubes and therefore do not cause false setting up of the synchronizing circuits at undesirable times. In this respect, the automatic gain control setting on the separator tube cathodes, by way of resistor 69, automatically adjusts the synchronizing circuit acceptance in the presence of varying signal levels to include that amount of synchronizing pulse energy which will afford improved circuit operation in the presence of any remaining noise pulses. This circuit is therefore preferred in combination with the noise cancellation circuits to which this invention is more particularly directed. Operation of the automatic gain control circuit is described in detail in the published Service Notes released August 31, 1951, pertaining to the RCA television receiver KCS66.

To prevent harmonic radiation the by-pass capacitor 50 is connected from the screen grid 51 of tube 14 to ground. The screen grid circuit therefore is degenerative to the noise frequencies only. Not only does this provide amplified noise at terminal 36 but it simultaneously decreases the output noise at the plate 52 of the tube 14 and at the subsequent video amplifier 15. Accordingly this manner of operation alone decreases noise response and therefore further amplification of the noise becomes unnecessary for operation of the noise inverter circuit to cancel noise signal at the separator circuits 30, 32. Likewise the noise energy arriving at the reproducing device 23 is decreased and affords an improved picture.

As shown by pulses 41'' and 43'' in Figure 3*c*, the signal arriving at the separator circuits 30, 32 may be improved in all cases where the noise extends above the tube acceptance but may be effectively eliminated only when exceeding the sync pulse level. An amplification stage may be used in the noise input lead 54, if desired, to further improve operation of the circuit in cases where isolation is required or total cancellation is not otherwise possible because of compromise between existing circuit impedance requirements and maximum available input noise cancellation signals. The circuit, however, functions without additional amplification to substantially improve synchronization and video circuit performance in the presence of high amplitude noise impulses.

The noise input lead 54 is preferably connected to a resistive voltage divider 58, 59 coupling the input circuits of the two separator circuits 30, 32. Some of the noise energy is lost in this voltage divider, but a good compromise is effected between maintaining the maximum vertical and horizontal sync input voltages with minimized loading by the noise circuits, and providing an acceptable portion of the total noise cancellation energy. The major cancellation is effected in the vertical separator circuit 30, but substantial improvement in the presence of noise is also effected in the horizontal separator circuit 32 in this manner.

Figure 4:
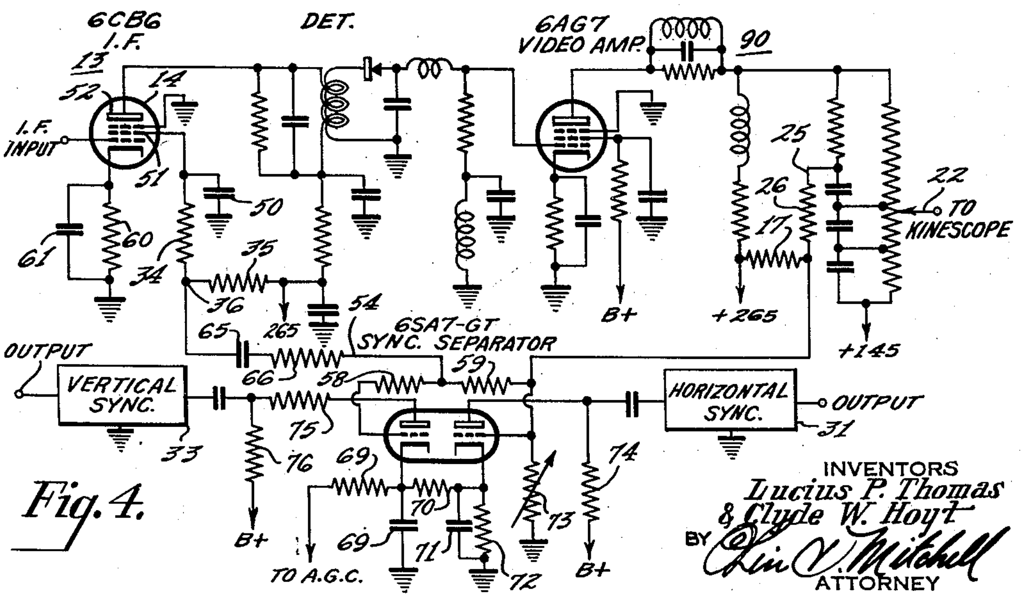
Figure 4 is a detailed circuit diagram of a portion of a television receiver embodying the teachings of this invention.

A detailed circuit is shown in Figure 4 and the approximate circuit values of those components, which along with the labeled voltages and tube types will enable one skilled in the art to more readily understand and construct the invention, as listed hereinafter:

| | | |
|---|---|---|
| **R60** | ohms | 180 |
| **C61** | μμf | 4,700 |
| **C50** | μμf | 47,000 |
| **R34** | ohms | 1,000 |
| **R35** | do | 47,000 |
| **C65** | μf | .033 |
| **R66** | ohms | 100,000 |
| **R59** | do | 56,000 |
| **R58** | do | 47,000 |
| **C69** | μf | .002 |
| **R70** | ohms | 220,000 |
| **C71** | μfd | .01 |
| **R72** | ohms | 150,000 |
| **R73** | do | 77,000 |
| **R69** | megohms | 1.8 |
| **R74** | ohms | 1,200 |
| **R75** | do | 120,000 |
| **R76** | megohm | 1 |
| **R27** | ohms | 470,000 |
| **R26** | do | 33,000 |

The novel features of the circuit operate in substantially the same manner as described in connection with Figure 1. Other features are known in the art, such as the video amplifier circuit 90, which is fully described in the copending application of B. E. Denton, Ser. No. 218,310, filed March 30, 1951.

Therefore the nature and operation of the invention being fully explained, certain features illustrative of the invention are defined with particularity in the appended claims.

What is claimed is:

1. In a television receiving circuit for receiving an amplitude modulated television carrier having maximum amplitude intelligence excursions defined by the synchronizing pulse component of the television signal and subject to undesired noise interference resulting in excursions in excess of said maximum amplitude intelligence excursions, the combination of: a signal input terminal means for accepting a television carrier of the type described; an amplifier tube for amplifying received modulated carrier type television signals prior to demodulation, said amplifier tube including an anode, cathode, screen electrode and control electrode, an input circuit operatively connected between said cathode and said control electrode, an output circuit operatively connected between said anode and cathode, a power supply operatively connected with said output circuit and a galvanically conductive screen impedance connected between said screen electrode and said power supply to supply screen current to said amplifier tube; a first amplifier means connected between said input terminal means and said amplifier tube input circuit for driving said amplifier tube with an amplified version of signals appearing at said signal input terminal means, means for establishing the gain of said first amplifier means such that noise pulse excursions in excess of said maximum amplitude excursions cause related increases in screen current in said amplifier tube to produce noise pulse excursions across said screen impedance; a video signal detector having input and output circuits, said detector input circuit being operatively coupled with the output circuit of said amplifier tube for developing a video signal; a video signal utilization means having an input circuit; a video amplifier operatively coupled between the output circuit of said detector and the input circuit of said utilization means; and means operatively coupled between said screen grid impedance and the input circuit of said utilization means to apply noise pulses appearing at said impedance to said utilization means in a polarity opposite to the noise pulses applied to said utilization means by said video amplifier to cancel noise excursions in the signal delivered by said video amplifier.

2. In a television receiving circuit for receiving an amplitude modulated television carrier in which television synchronizing pulse components are represented by a fixed percentage of carrier modulation, the combination of: a signal input terminal means for accepting modulated carriers of the type above described; a circuit ground means; a signal amplifying means including signal input and signal output circuits for amplifying a carrier modulated by television signals of the type described, said amplifying means including a pentode amplifier tube having a control electrode, said tube also having an anode and a cathode operatively connected with power supply means and a screen electrode connected with a source of ground referenced positive potential through a screen load impedance; an automatic gain control circuit means operatively coupled with said signal amplifying means for regulating the gain of said amplitude so as to minimize amplitude changes in the signal delivered at said output means due to variations in the amplitude of the carrier applied to said amplifier for establishing the signal applied to said pentode tube at an amplitude such that the pentode tube is nominally driven at signal levels below that causing signal intelligence excursions to produce anode saturation in said pentode tube and nonlinear screen current conduction but permitting noise excursions to establish such saturation and nonlinear screen conduction whereby the signals appearing across said screen load impedance are preponderantly representative of noise components; signal demodulation means coupled with the output means of said amplifier means for demodulating received television signals; and signal combining means coupled with the output of said signal demodulating means and said screen current impedance means combining demodulated television signal with signals developed across said screen impedance in a polarity relation such that noise signals appearing across said screen load impedance tend to cancel noise components appearing in said demodulated television signal to produce a net reduction in the apparent noise in said demodulated television signal.

3. In a television receiving circuit for receiving an amplitude modulated television radio carrier having maximum amplitude intelligence excursions defined by the synchronizing pulse component of the television signal and subject to undesired noise interference resulting in excursions in excess of said maximum amplitude intelligence excursions, the combination of: a radio signal input terminal means for accepting a television radio carrier of the type described; a first amplifier means for amplifying received amplitude modulated carrier type television signals prior to demodulation, said amplifier means including a datum ground means, at least one amplifier tube having an anode, cathode, screen electrode and control electrode, an input circuit operatively connected between said cathode and said control electrode, an output circuit operatively connected between said anode and cathode, a power supply means operatively connected with said output circuit and said datum ground and a galvanically conductive impedance connected between said screen electrode and said power supply to supply screen current to said amplifier tube, a second amplifier means connected between said input terminal means and said amplifier input circuit for driving said amplifier tube with an amplified version of radio signals appearing at said radio signal input terminal means, said second amplifier means including means establishing the gain thereof such that noise pulse excursions in excess of said maximum amplitude excursions cause related increases in screen current in said amplifier tube to produce noise pulse excursions across said impedance; a video signal detector circuit means having signal input and output means and referenced to said ground datum, said input means being operatively coupled with the output of said first amplifier means for demodulating said received radio carrier; a synchronizing signal separator circuit means referenced to said datum ground means, for accepting demodulated video and separating therefrom synchronizing signal components, said separator circuit having a signal input means and a signal output means; a video signal amplifier referenced to said datum ground means and having signal input and output means, said input means being coupled with said video detector signal output means for amplifying demodulated television signals, said video signal amplifier including means to deliver amplified television signal at its output means having synchronizing components extending in a positive-going direction relative to said datum ground means; a first resistance means connected from said video amplifier signal output means to said separator circuit signal input means for applying video signal thereto in which noise excursions are positive-going with respect to said datum ground; and a second resistance means connected from said screen impedance to said separator circuit signal input means for applying noise pulses thereto negatively extending relative to datum ground, and tending to cancel said positive-going noise excursions in signals delivered by said video amplifier.

4. In a television receiving circuit for receiving an amplitude modulated television carrier having maximum amplitude intelligence excursions defined by the synchronizing pulse component of a standard television signal and subject to undesired noise interference resulting in unwanted excursions in excess of said maximum amplitude intelligence excursions, the combination of: a signal input terminal means for accepting a television carrier of the type described; an amplifier tube for amplifying received modulated carrier type television signals prior to demodulation, said amplifier tube having a plurality of electrodes including a plurality of grids, an anode and a cathode, at least one of said electrodes being designated as an electron collecting electrode; input circuit means operatively coupled between said cathode and one grid to form an input circuit; a source of operating potential for said electron collecting electrode, said source having a positive and negative terminal; direct current connections from said cathode to said negative terminal; direct current load means including a resistor connected from said electron collecting electrode to said positive terminal; means including said load means and a carrier signal output circuit for said tube establishing the operation of said tube in substantial accordance with pentode characteristics, the value of said resistor being such that on noise interference excursions appearing in said input circuit which are in excess of a given amplitude, an overload condition is produced in said tube to provide a sharp discontinuity in the electron current flow to said electron collecting electrode; amplifier means operatively connected between said input terminal means and said input circuit for applying signals thereto of sufficient amplitude that noise interference excursions in excess of said synchronizing pulse component cause said sharp discontinuity in electron current flow such that said noise excursions are substantially clipped from the received television carrier signals to produce separated noise signal excursions across said resistor; a television carrier signal detector having input and output circuits, said detector input circuit being operatively coupled with the output circuit of said amplifier tube for developing in the output circuit of said detector a demodulated video signal; a video signal utilization means having an input circuit, said utilization means being undesirably susceptible to noise excursions exceeding the amplitude of the synchronizing pulse component in received television signals; signal coupling means operatively connected between the output circuit of said detector and the input circuit of said utilization means, such that the synchronizing pulse component of demodulated television signal extends in a given polarity direction at the input circuit of said utilization means; and signal coupling means operatively coupled between said resistor and the input circuit of said utilization means to apply separated noise signal excursions to said utilization means input circuit in a polarity direction opposite to the synchronzing pulse component of received television signals such that said separated noise signal excursions tend to cancel noise excursions in the signal coupled to said utilization means from said detector.

References Cited in the file of this patent

UNITED STATES PATENTS

| | | |
|---|---|---|
| 2,230,295 | Holmes | Feb. 4, 1941 |
| 2,293,528 | Barco et al. | Aug. 18, 1942 |
| 2,294,341 | Moore | Aug. 25, 1942 |
| 2,299,333 | Martinelli | Oct. 20, 1942 |
| 2,304,713 | Smith | Dec. 8, 1942 |
| 2,535,821 | Thomas | Dec. 26, 1950 |
| 2,597,629 | Foster | May 20, 1952 |
| 2,602,864 | Bagley | July 8, 1952 |
| 2,631,230 | Marsh | Mar. 10, 1953 |